US008868664B2

(12) United States Patent
Sunkara et al.

(10) Patent No.: US 8,868,664 B2
(45) Date of Patent: Oct. 21, 2014

(54) SYSTEMS AND METHODS FOR REGISTERING AND MANAGING DOMAIN NAMES AND E-MAIL ADDRESSES VIA A RESOURCE-LIMITED INTERFACE

(75) Inventors: Srinivas Sunkara, Ashburn, VA (US); Karthik Shyamsunder, Winchester, VA (US); Venkata Sai Phani Kumar Pattapu, Ashburn, VA (US)

(73) Assignee: Verisign, Inc., Reston, VA (US)

(*) Notice: Subject to any disclaimer, the term of this patent is extended or adjusted under 35 U.S.C. 154(b) by 153 days.

(21) Appl. No.: 13/248,379

(22) Filed: Sep. 29, 2011

(65) Prior Publication Data
US 2012/0079047 A1    Mar. 29, 2012

Related U.S. Application Data

(60) Provisional application No. 61/387,682, filed on Sep. 29, 2010.

(51) Int. Cl.
*G06F 15/16* (2006.01)
*H04L 29/12* (2006.01)
*H04L 12/58* (2006.01)

(52) U.S. Cl.
CPC .......... *H04L 61/302* (2013.01); *H04L 61/3025* (2013.01); *H04L 51/28* (2013.01); *H04L 29/12726* (2013.01); *H04L 29/12641* (2013.01); *H04L 61/307* (2013.01); *H04L 29/12632* (2013.01)
USPC ........................................................ 709/206

(58) Field of Classification Search
CPC .. H04L 29/12622–29/12641; H04L 29/06068; H04L 29/08756; H04M 2250/64
USPC .......... 709/206–207, 239, 245–246; 455/466
See application file for complete search history.

(56) References Cited

U.S. PATENT DOCUMENTS

| 2004/0122905 | A1* | 6/2004 | Smith et al. .................. 709/206 |
| 2009/0248735 | A1* | 10/2009 | Adelman et al. .......... 707/103 R |
| 2010/0106731 | A1 | 4/2010 | Cartmell et al. |
| 2010/0146119 | A1 | 6/2010 | Lee |

FOREIGN PATENT DOCUMENTS

| GB | 2381998 A | * 5/2003 | ............... H04Q 7/22 |
| WO | WO 98/47270 | 10/1998 | |
| WO | WO 99/35595 | 7/1999 | |
| WO | WO 03/049402 | 6/2003 | |

OTHER PUBLICATIONS

Unknown, "Email to SMS gateway—The giffgaff community", on Jul. 12, 2010; retrieved from the Internet: URL: http://community.giffgaff.com/t5/Help-Ask-the-community-got-stuck/Email-to-SMS-gateway/td-p/34565; retrieved on Nov. 28, 2011.
International Search Report and Written Opinion issued in International Patent Application No. PCT/US2011/053850; date of mailing: Dec. 9, 2011.

* cited by examiner

*Primary Examiner* — Brendan Higa
(74) *Attorney, Agent, or Firm* — MH2 Technology Law Group, LLP

(57) ABSTRACT

Disclosed embodiments provide domain name registration, e-mail registration, e-mail forwarding, and other services via resource-limited interfaces, such as SMS-based services. Domain names may be requested, registered, and managed, and e-mail addresses may be requested and forwarding options selected by a user by way of a resource-limited device or protocol. E-mails may be provided to a user over an e-mail-to-SMS forwarding system.

26 Claims, 8 Drawing Sheets

SYSTEM MESSAGE                                                USER MESSAGE (DOMAIN):Want your personalized
email address and website with your            Marketing message sent to
name? Also get your email via SMS.             users with invitation to register
Send 'myname is <firstname>                    domain and/or email
<lastname>' to 32075

605

User sends shortcode, e.g.                  Myname is john adams
                                               "32075 john adams" or similar
                                               response                                    610

Generate and check availability
                                               of domain/email based on
                                               response (MYMAIL):Choose from
1: adams@jon.name
2: johnny@adams.name                           Response provides choices
3: adams@johnny.name                           available domains/email
                                               addresses
Reply 'MYMAIL create <#> <email>'

615

User chooses address/domain                 Mymail create 2
                                               and responds with selection                 jack.frost@gmail.com

620

Register domain and/or create
                                               email address (MYMAIL):Congratulations! Your
email johnny@adams.name and                    Provide account information
website johnny.adams.name are                  after successful creation
ready to use. Your account
password is:password1

SYSTEMS AND METHODS FOR REGISTERING AND MANAGING DOMAIN NAMES AND E-MAIL ADDRESSES VIA A RESOURCE-LIMITED INTERFACE

This application claims priority to U.S. Provisional Application No. 61/387,682, filed on Sep. 29, 2010, the disclosure of which is incorporated herein by reference in its entirety.

FIELD

This disclosure is generally directed to systems and methods for registering domain names via a restricted user interface and, more particularly, to systems and methods for interacting with a domain name registrar using an interface on a mobile computing device.

BACKGROUND

A variety of mobile devices have limited input and/or display capabilities. These limited device capabilities have led to the development of various input and communication methods. For example, a short message service (SMS) communication protocol is used to exchange short text messages among devices. Other protocols and techniques are also used in mobile devices, and have extended to non-limited devices, such as general personal computers. Users connected by a network use SMS and similar messages to communicate, for example, as where cellular subscribers communicate with each other via SMS text messages sent between their mobile phones or other mobile devices.

The use of mobile devices for communications has been increasing significantly and has become dominant in some countries. In such countries, mobile device users use SMS and other resource-limited communications extensively. In addition, many people rely on electronic communications, such as e-mail and SMS, as their principal form of communication. While companies wishing to reach a variety of customers must adopt a variety of communication methods, some transactions do not easily adapt to a limited communication and/or display format.

Because of the restrictions inherent in resource-limited systems, they are not usually suited for use in situations that require substantial input from users, or applications that present a large amount of data or a large number of options to users. For example, the processes of registering and managing a domain name and the associated services and functionality have not been made available via SMS or other resource-limited systems due to the amount of data and user-input involved. Therefore it is desirable to introduce systems and methods that facilitate user interaction with a domain name registrar using a resource-limited interface.

SUMMARY

A "resource-limited" message refers to a message sent within a protocol or system, such as SMS or tweets, in which the contents or input techniques for the system are restricted. For example, SMS messages typically are restricted to 160 characters or less. Resource-limited messaging systems generally are suited for use on mobile devices such as cellular phones, smartphones, notebooks, netbooks, tablets, or other portable computing devices, and the like. Other examples of resource-limited systems include the Multimedia Messaging Service (MMS), the Enhanced Messaging Service (EMS), etc., and may encompass systems and services designed to make use of such messages, such as Twitter, Tumblr, Identi.ca, Jaiku, etc. A "resource-limited message" may be a message sent or received within any such system that is so restricted.

Disclosed embodiments allow a user to determine what domains may be available from a domain name registrar, choose one of the available domains for registration, and register the domain all using a resource-limited interface, such as SMS, MMS, EMS, etc. Disclosed embodiments may also enable a user to send and receive e-mail communications via such a resource restricted interface.

Consistent with disclosed embodiments, a method is disclosed for determining the availability of a domain name using a resource-restricted interface. The method may include receiving, by a processor, a request for availability of a domain name via a Simple Messaging Service (SMS) protocol message sent by a user, determining availability of the requested domain name, generating domain name variants of the requested domain name and determining availability of each of the generated variants. The method may also include sending an SMS message to the user that provides an indication of the availability of the requested domain name and a list of available domain names, the list including available variants and the requested domain name, if available. In some embodiments, the method may also include receiving an indication of a selection of one of the available domain names provided in the list via an SMS message and registering the selected domain name.

Also consistent with disclosed embodiments, a system is provided having a processor and a memory. The memory may include instructions that, when executed by the processor, cause the processor to perform the operations of receiving a resource-limited message sent by a user, the message including at least one term, generating at least one domain name based upon the at least one term, and determining availability of the generated at least one domain name. The operations may also include sending a resource-limited message to the user indicating that the at least one domain name is available and receiving a selection of the at least one domain name from the user via a resource-limited message. In response to receiving the selection, the operations may also include registering the selected domain name.

Consistent with other disclosed embodiments, a method is provided for sending email messages using to a resource-limited interface. The method may include receiving an email addressed to a recipient and assigning the email an identifier. The method may also include sending a resource-limited message to the recipient that includes an indication of a sender of the email, a predetermined number of characters from a subject-line of the email, and the assigned identifier. According to some embodiments, the resource-limited message may also include an instruction for reading the body of the email. The method may also include receiving a second resource-limited message indicating a request to read the email. The second message may optionally include the assigned identifier. The method may also include responding to the second message by sending a third resource-limited message to the recipient comprising a predetermined number of characters from a body of the email and, optionally, an instruction for reading the remainder of the characters of the body. If the entire body of the email has been sent to the recipient, the third message may also include an indication of such.

Consistent with other disclosed embodiments, computer-readable media, such as storage devices, may store program instructions that are executable by one or more processors to implement any of the methods, disclosed herein.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate several embodiments and, together with the description, serve to explain the disclosed principles. In the drawings:

FIG. 6 is a flow diagram illustrating a method for registering a domain and e-mail address, consistent with disclosed embodiments;

DESCRIPTION OF THE EMBODIMENTS

To allow for more convenient use of domain name registration and management processes with modern communication systems, disclosed embodiments include various techniques for making domain registration processes available via resource-limited systems, such as an SMS system. Disclosed embodiments also provide systems for using a resource-limited messages to access e-mail messages. Such embodiments send e-mail alerts to a user in an SMS format, allow the user to read a selected e-mail by selecting the associated alert, and enable the user to send an e-mail message using the SMS application.

Systems and methods as disclosed herein may provide a variety of benefits not available in conventional SMS, e-mail, or other systems. For example, e-mail-to-SMS systems as disclosed may allow for users to send and receive e-mail messages on a cellular phone or other device that does not have a traditional data plan, or is not capable of performing more complex data functions, but that has access to an SMS system. When receiving requests for domain name or e-mail registration, receiving e-mail, or sending e-mail via a resource-limited interface, disclosed embodiments may use a predetermined word (i.e. a code word) as an indication that what follows is a specific type of request.

Reference will now be made in detail to exemplary embodiments, examples of which are illustrated in the accompanying drawings. Wherever convenient, the same reference numbers will be used throughout the drawings to refer to the same or like parts.

Figure 1:
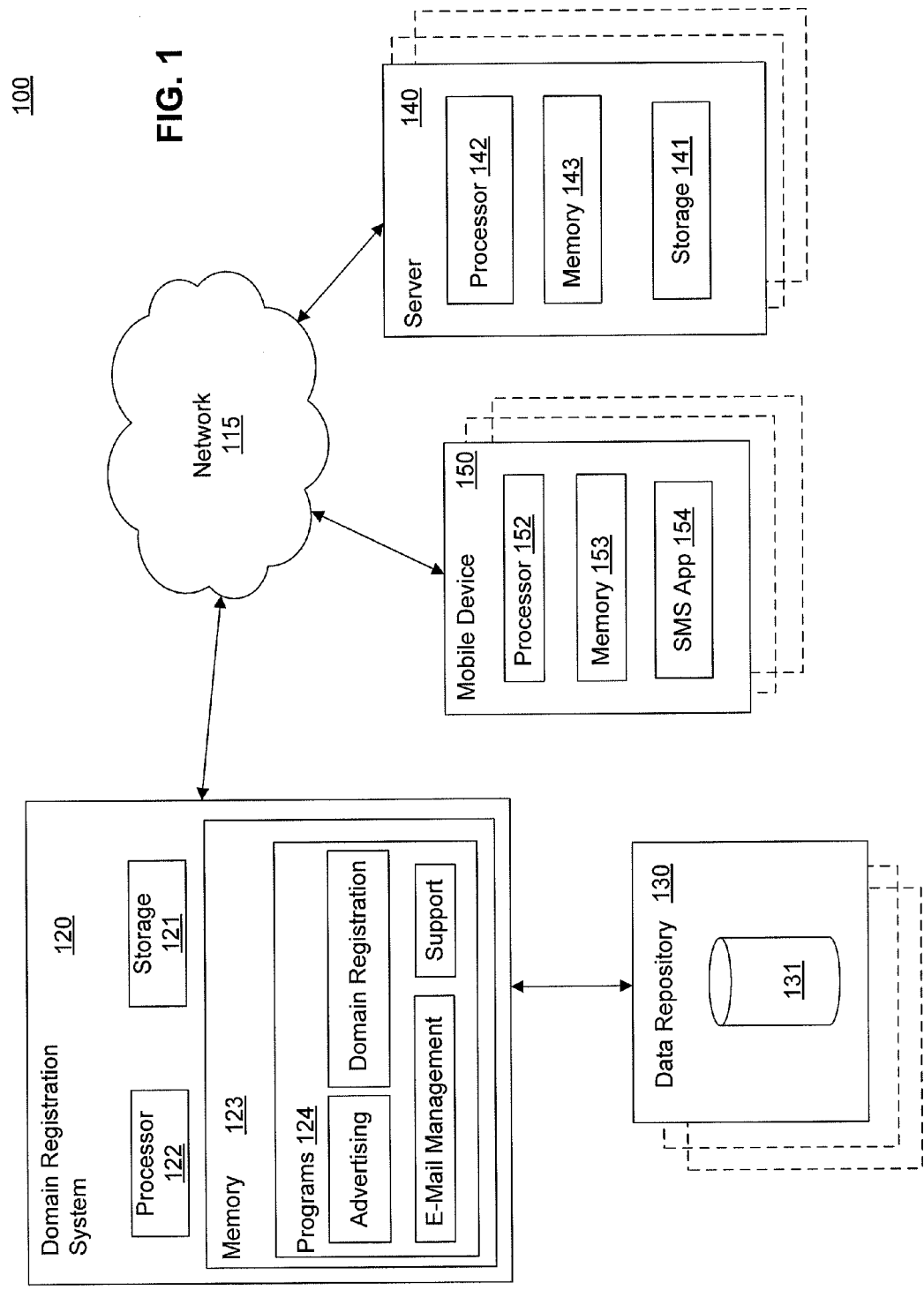
FIG. 1 is a diagram illustrating an exemplary domain registration system that may be used to implement disclosed embodiments.

FIG. 1 is a diagram illustrating an exemplary resource-limited domain registration and e-mail system 100 that may be used to implement disclosed embodiments, including exemplary system components. The components and arrangement, however, may be varied. Domain registration system 120 may include a processor 122, a memory 123, input/output (I/O) devices (not shown), and storage 121. Domain registration system 120 may be implemented in various ways. For example, domain registration system 120 may be a general purpose computer, a server, a mainframe computer, or any combination of these components. Domain registration system 120 may communicate over a link with network 115. For example, the link may be a direct communication link, a LAN, a WAN, a wireless link, or other suitable connection. Network 115 may include the Internet and/or a cellular phone network. Domain registration system 120 may be standalone or it may be part of a subsystem, which may, in turn, be part of a larger system. Domain registration system 120 may be associated with one or more longcodes or shortcodes, allowing domain registration system to receive, for example, SMS messages. Shortcodes and longcodes are special telephone numbers that can receive an SMS or MMS message from mobile devices, such as phones.

Processor 122 may include one or more known processing devices, such as a microprocessor from the Pentium™ or Xeon™ family manufactured by Intel™, the Turion™ family manufactured by AMD™, or any of various processors manufactured by Sun Microsystems. Memory 123 may include one or more storage devices configured to store information used by processor 122 to perform certain functions related to disclosed embodiments. Storage 121 may include a volatile or non-volatile, magnetic, semiconductor, tape, optical, removable, nonremovable, or other type of storage device or computer-readable medium.

In one embodiment, memory 123 may include one or more domain registration or e-mail management programs or subprograms 124 loaded from storage 121 or elsewhere that, when executed by domain registration system 120, perform various procedures, operations, or processes consistent with disclosed embodiments. For example, memory 123 may include an advertising program that sends electronic messages, including resource-restricted messages, to users to encourage domain name registration; a domain registration program that receives a request for a domain name registration, determines available domains based on the received request and generated variants, and registers the domain a user selects; an e-mail management program that manages e-mail forwarding options and e-mail functions related to a resource-limited interface; and an integrative support program that links the other programs and allows them to use a common database, provides a common user interface, performs basic bookkeeping tasks, (such as storing user-supplied information and user e-mail preferences), and provides user guidance and help. Memory 123 may also include other programs that perform other functions and processes, such as programs that provide communication support, Internet and cellular network access, etc.

Methods, systems, and articles of manufacture consistent with disclosed embodiments are not limited to separate programs or computers configured to perform dedicated tasks. For example, memory 123 may be configured with a program 124 that performs several functions when executed by processor 122. For example, memory 123 may include a single program 124 that performs the functions of the domain registration and e-mail system, or program 124 could comprise multiple programs. Moreover, processor 122 may execute one or more programs located remotely from domain registration system 120. For example, domain registration system 120 may access one or more remote programs that, when executed, perform functions related to disclosed embodiments.

Memory 123 may be also be configured with an operating system (not shown) that performs several functions well known in the art when executed by domain registration system 120. By way of example, the operating system may be Microsoft Windows™, Unix™, Linux™, Solaris™, or some other operating system. The choice of operating system, and even to the use of an operating system, is not critical to any embodiment.

Domain registration system 120 may include one or more I/O devices (not shown) that allow data to be received and/or transmitted by domain registration system 120. I/O devices may also include one or more digital and/or analog communication input/output devices that allow domain registration system 120 to communicate directly with users or with other machines and devices, such as server 140 or mobile device 150. In some embodiments, mobile device 150 may receive resource-limited messages from domain registration system 120 and send resource-limited messages to domain registration system 120. In some embodiments, this may be accomplished using a longcode or shortcode assigned to domain registration system 120. In response, domain registration system may access data stored in storage 121 or data repository 130 and/or run one or more of programs 124. Domain registration system 120 may receive data from external machines and devices and output data to external machines and devices via I/O devices. The configuration and number of input and/or output devices incorporated in I/O devices may vary as appropriate for certain embodiments.

Domain registration system 120 may also be communicatively connected to one or more data repositories 130, either directly or indirectly, e.g., through a network such as network 115. Data repository 130 may include one or more files or databases 131 that are accessed and/or managed through domain registration system 120. By way of example, the databases may be MongoDB® databases, Oracle™ databases, Sybase™ databases, other relational databases, or non-relational databases. The databases or other files may include, for example, data and information related to domain registrations for one or more top-level domains or domain owner account information, such as the contact information of an owner of a domain, and/or e-mail preferences for users having an email account at a registered domain. Systems and methods of disclosed embodiments, however, are not limited to any particular database or layout.

Domain registration system 120 may be communicatively connected to one or more network servers 140 through network 115. Server 140 may host a website for a registered domain or host e-mail services. Server 140 may include a processor 142, a storage 141, and a memory 143. Storage 141 may be a volatile or non-volatile, magnetic, semiconductor, tape, optical, removable, nonremovable, or other type of storage device or computer-readable medium and may store data used to display a website.

Domain registration system 120 may also be communicatively connected to one or more mobile devices 150 through network 115. Mobile device 150 may include a processor 152, a memory 153, and a resource-limited application, such as SMS application 154. SMS application 154 may communicate with domain registration system 120. Domain registration system 120 may send data to processor 151 and SMS application 154, and SMS application 154 may display the data in its resource-limited interface.

Mobile device 150 may send data to domain registration system 120 indicating selection of an available domain name or a particular e-mail message. Mobile device 150 may also send domain name registration requests to domain registration system 120. Mobile device 150 may include I/O devices (not shown) such as a keypad and display, to enable communication with a user. For example, the I/O devices may include one or more input devices, such as a keyboard, touch screen, trackball, mouse, and the like, that enable mobile device 150 to receive data from a user, such as requests for available domains, requests to register a particular domain, requests to send or receive e-mail messages, etc. Further, mobile device 150 may include I/O devices that present data to the user.

In one embodiment, a user can check for availability and register second and third level domains using a resource-limited system, such as SMS. The registrant may initiate a check for the availability of a domain by sending an SMS message, or other abbreviated message, beginning with a special code word to a dedicated and/or shared longcode or shortcode. For example, the registrant may send a text message that includes "first, last" to a particular shortcode or longcode to determine if the domain "first.last.name" is available. In other embodiments, the user may send a text message that includes "company" to determine if a domain such as "company.com" is available for registration. Other formats and content for the domain request may be used.

The receiving system may then create combinations of the received text, generate variants of the received text, and check for availability of one or more domain names based on the received text and the generated variant combinations. The system also may suggest one or more domain names for registration of those that are determined to be available.

The user may then select one or more domains and/or e-mail addresses to register, and may enter additional information such as an existing e-mail address, contact information, and the like, to complete the registration. The communications between the registration system and the user may be carried out over SMS or other resource-limited messages.

In one embodiment, a registration or other system may provide e-mail forwarding using a resource-limited interface, such as for a registered e-mail address and/or one or more addresses associated with a registered domain. In one configuration, any e-mails received at an e-mail address, such as an e-mail registered at domain, will be forwarded to an existing e-mail address or sent as an alert in a resource-limited message, such as SMS.

For example, a user may register a domain name such as domain.name, and an associated e-mail address of mail@domain.name. If the user's existing e-mail address is mail@existingemailaddress.com, then all e-mails received at mail@domain.name will be forwarded to mail@existingemailaddress.com. Although certain types of e-mail forwarding in general are known in the art, one novel aspect of the systems and techniques disclosed herein provides for various techniques for forwarding e-mail via resource-limited messages. For example, instead of forwarding the e-mail to mail@existingemailaddress.com, disclosed embodiments may send an SMS message alerting the user to the receipt of the message, and may forward portions of the message through an SMS message at the request of the user.

Figure 2:
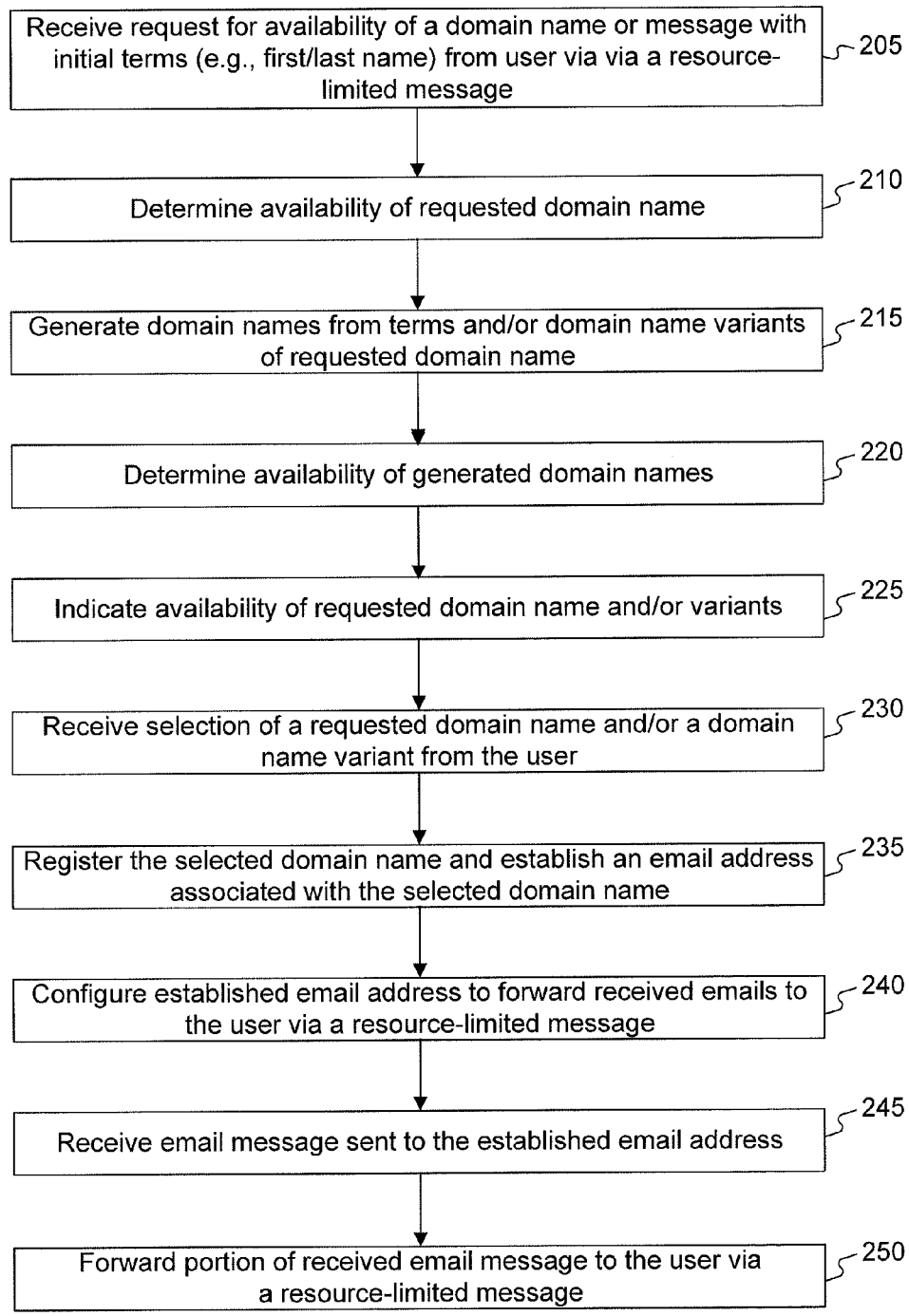
FIG. 2 is a flow diagram illustrating a method for registering and managing a domain using a resource-limited interface, consistent with disclosed embodiments.

FIG. 2 shows an exemplary methods for registering and managing domains and e-mail addresses, consistent with disclosed embodiments. It will be understood that other embodiments may include different combinations of steps and techniques than specifically shown in FIG. 2. For example, some embodiments may register domain names and provide user interfaces for registering domain names, but not provide e-mail forwarding services. Similarly, other embodiments may not register domain names and/or e-mail addresses, but may provide various forwarding or e-mail-to-SMS services.

In step 205, domain registration system 120 receives a request for availability of a domain name via a resource-limited message, such as SMS. In some embodiments, the request may be in response to an advertisement or other promotional message sent by domain registration system 120. Domain registration system 120 may receive the request via an associated shortcode or longcode. The request may include keywords, or other initial terms that domain registration system 120 may use to determine potential domains. For example, the message may contain the first and last name of a user, which domain registration system 120 may interpret as a request for a .name domain. In other embodiments, the message may contain a single word or a string of words, which domain registration system 120 may interpret as a request for a .com or .net domain. In other embodiments, the message may contain keywords, which causes domain registration system 120 to determine any domain that would be appropriate for the keywords.

Figure 3:
FIGS. 3-5 display exemplary interfaces used for registering a domain using resource-limited messages, consistent with disclosed embodiments.

FIG. 3 shows an exemplary interface for registering a domain and, optionally, an associated e-mail address via SMS messages. In the example of FIG. 3, a user sends a text message to a predefined number, shortname, or other destination. The format of the message may be predefined, for example, to identify a particular top level domain, second level domain, and/or additional domain portions desired by a user. The user may initiate the process by sending a message beginning with a code word, such as "MYMAIL," as shown.

In step 210, domain registration system 120 may determine the availability of the requested domain name. Domain registration system 120 may use data stored in repository 130 to determine if the domain name has already been registered by another user. In step 215, domain registration system 120 may generate variants of the requested domain, or of keywords submitted as part of the message. Variants may be determined in accordance with known methods, such as the method described in U.S. Patent Publication No. 2010/0106731 entitled "Determining Alternative Textual Identifiers Such as For Registered Domain Names," the disclosure of which is incorporated herein by reference. In step 220, domain registration system 120 may determine the availability of the generated variants.

In step 225, domain registration system 120 may indicate the availability of the various domains. In some embodiments, domain registration system 120 may send an SMS message to the requestor that includes the available domains with an associated index. The index may help the user to select a desired domain name in the resource-limited interface.

Figure 4:
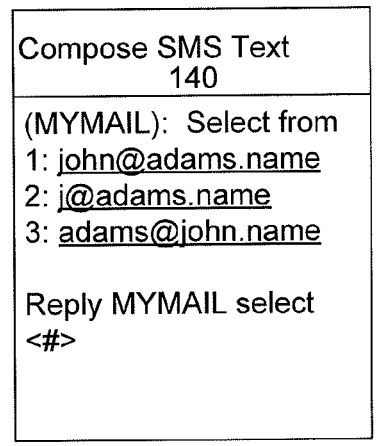

FIG. 4 shows an example response generated by domain registration system 120 to the message illustrated in FIG. 3. In the example of FIG. 4, domain registration system 120 provides several e-mail addresses or domain names that are available for use or registration. The e-mail addresses or domain names may be generated based on a request similar to the request shown in FIG. 3. As those of ordinary skill will understand, the response generated by domain registration system 120 may specify domain names rather than e-mail addresses. In some embodiments, domain registration system 120 may send a message that includes both available domain names and associated e-mail addresses for the domain(s) that are available. The user may respond by sending a message back to domain registration system 120 that includes a selection of one of the choices presented. In response to the user's message, domain registration system 120 may register the selected domain(s) and/or e-mail address(es).

In step 230, domain registration system 120 may receive the user's selected domain name or email address and, in step 235, may register the selected domain name. In embodiments where domain registration system 120 also provides e-mail forwarding, domain registration system 120 may establish an email address associated with the selected domain name. For example, if the selected domain is "johnny.adams.name," domain registration system 120 may set up an associated email of "johnny@adams.name."

Figure 5:
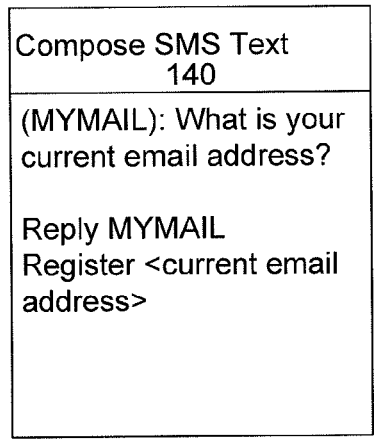

In step 240, domain registration system 120 may send a message to the user requesting a current email address so that any messages sent to the e-mail address established in step 235 are forwarded to the user via a resource limited message. FIG. 5 shows an example of a resource-limited message requesting the user's forwarding e-mail address, i.e., an e-mail address to which domain registration system 120 will forward e-mail sent to the address selected in response to the message in FIG. 4. The user may respond by sending an SMS message, or other resource-limited message, that provides an appropriate e-mail address selected by the user. In response, domain registration system 120 may configure an e-mail forwarding system to forward any mail received at the address associated with the registered domain (i.e. the selected address shown in FIG. 4) to the e-mail address identified by the user.

An example of a domain registration process using resource-limited messages will now be explained using FIG. 6. In the example of FIG. 6, domain registration system 120 may send a marketing message to various users. The marketing message may contain an invitation to register a domain and/or email address using a resource-limited message, such as SMS. The message may contain information similar to that shown in message 605. The message may include instructions on how to format the domain and/or email request and the shortcode associated with domain registration system 120.

The user may respond with an SMS message directed to the shortcode, such as message 610. In response to receiving message 610, domain registration system 120 may perform steps 210 to 225, as described above with regard to FIG. 2, and provide a resource-limited message 615 that contains an indication of the available domains/e-mail addresses and instructions for selecting one of the available domains. The instructions may include a prompt for a current email address. In other embodiments, domain registration system 120 may request the current e-mail address in a separate response, as shown in FIG. 5.

The user may respond with SMS message 620, selecting the second offered e-mail address and providing a current e-mail address. After receiving this response, domain registration system 120 may register the domain and/or create the email address. Upon successful registration and/or creation, domain registration system 120 may provide a resource-limited message 625 that confirms the successful registration and/or creation. The message may also include other details, such as the user e-mail account created, the domain named registered, or a default password used to access the domain and/or email account on domain registration system 120.

In some embodiments with e-mail forwarding, domain registration system 120 may provide an e-mail-to-SMS service. In some cases, the forwarding service may be provided for an e-mail account associated with a registered domain name, such as where the system allows users to register a domain name via SMS. In such embodiments, the forwarding service may receive e-mails at the registered domain e-mail address, and send SMS alerts to a destination specified by the user. The destination may be, for example, a mobile phone or other device, a phone number, or an account on a messaging, blogging, or micro-blogging system, such as Twitter, etc.

In various configurations, the following features may be provided in any combination to an end user of the e-mail-to-SMS system:
  Receive SMS notifications for e-mails received
  Manage SMS notifications based on sender
  Read e-mails via SMS
  Reply to e-mails via SMS
  Send e-mails via SMS to any existing e-mail address In general, when domain registration system 120 provides e-mails to the SMS destination, they may be provided in an abbreviated or summary format. For example, the SMS message received at the destination may include the sender, subject line, and the first portion of the e-mail body. Some or all of each part of an e-mail message may be included, and the end user may be able to specify which portions and/or how much of each portion of an e-mail message is included in the SMS message.

Returning to FIG. 2, in step 245, domain registration system 120 may receive an e-mail message directed to the newly established e-mail address. In step 250, domain registration system 120 may identify the email address supplied by the user, for example, through the process illustrated in FIG. 5 or 6, and forward a portion of the received e-mail message to the user using a resource-limited message interface.

Figure 7:
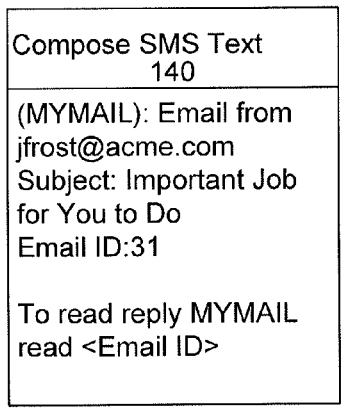
FIGS. 7-9 illustrate exemplary SMS messages that may be used in an e-mail-to-SMS system, consistent with disclosed embodiments.
Figure 8:
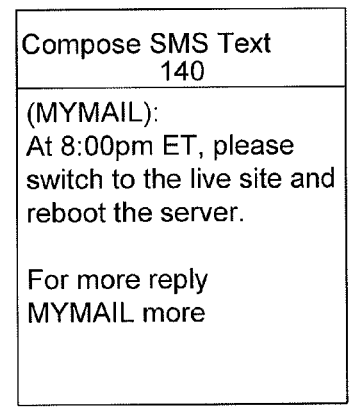
Figure 9:
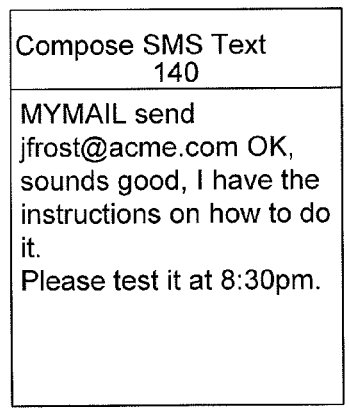

FIGS. 7-9 illustrate example resource-limited interfaces that may be used, for example, in an e-mail-to-SMS system. In FIG. 7, domain registration system 120 may send the user an SMS message indicating that a new e-mail has been received at the e-mail address configured for e-mail-to-SMS forwarding. In the example of FIG. 7, the notification message includes a basic or abbreviated e-mail header, including the subject line. In various configurations, more or less information may be provided. The user may indicate that he wishes to receive more of the message by sending a response via an SMS message of "read 31," as shown in FIG. 7.

FIG. 8 shows a portion of an e-mail message sent to the user, such as in response to receiving an SMS message indicating that the user wishes to receive more of the e-mail as described with respect to FIG. 7. In general, the type of message shown in FIG. 8 may display some or all of the e-mail message. If less than the entire message is shown, domain registration system 120 may provide a mechanism for the user to request an additional portion of the message. For example, domain registration system 120 may provide the instruction to reply with an SMS message that simply reads "more."

FIG. 9 shows an example SMS message sent by a user that causes domain registration server 120 to send an e-mail message via the e-mail-to-SMS system. Domain registration system 120 may receive the illustrated message and convert the message to a standard e-mail message format. Domain registration system 120 may then send the converted message to the destination address identified by the user via conventional e-mail message delivery techniques.

Figure 10:
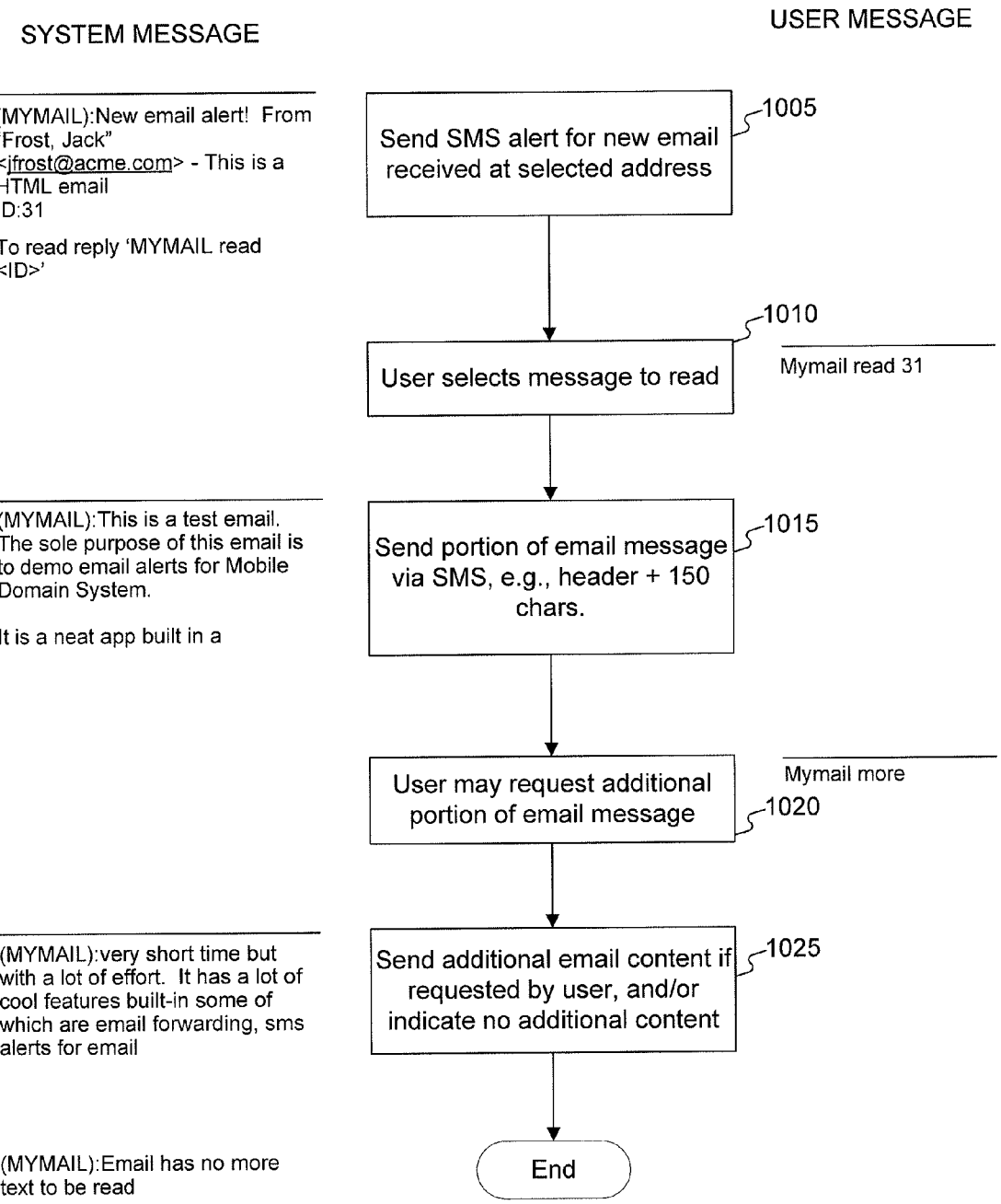
FIG. 10 is a flow diagram illustrating a method for receiving an e-mail alert and reading an e-mail using a resource-limited interface, consistent with disclosed embodiments.

FIG. 10 is a flow diagram illustrating a method for receiving an e-mail alert and reading an e-mail using a resource-limited interface, consistent with disclosed embodiments. At step 1005, domain registration system 120 may send a resource-limited message, such as an SMS alert, to the user that indicates the arrival of an e-mail message. The message may include a shortened version of the received e-mail, such as the sender and the subject line of the email. The message may also contain an identifier associated with the e-mail. In the example of FIG. 10, the identifier is the number 31.

In step 1010, domain registration system 120 may receive a selection of a message from the user. For example, the user may text back "read 31," which domain registration system 120 may interpret as a request to send more information on the email associated with identifier 31. In step 1015, domain registration system 120 may send a portion of the received e-mail message to the user. For example, domain registration system 120 may send a number of characters of the body of the e-mail. For example, domain registration system 120 may send enough characters to fill the character limit of an SMS message, or domain registration system 120 may send the first 100 characters of the e-mail body. If the entire message text does not fit in the message, in step 1020, domain registration system 120 may receive a request from the user to view additional e-mail message text. In step 1025, domain registration system 120 may send additional characters of the e-mail message, for example the next 100 characters. If there are no additional characters in the e-mail message, domain registration system 120 may include an indication that the entire message has been sent to the user.

Figure 11:
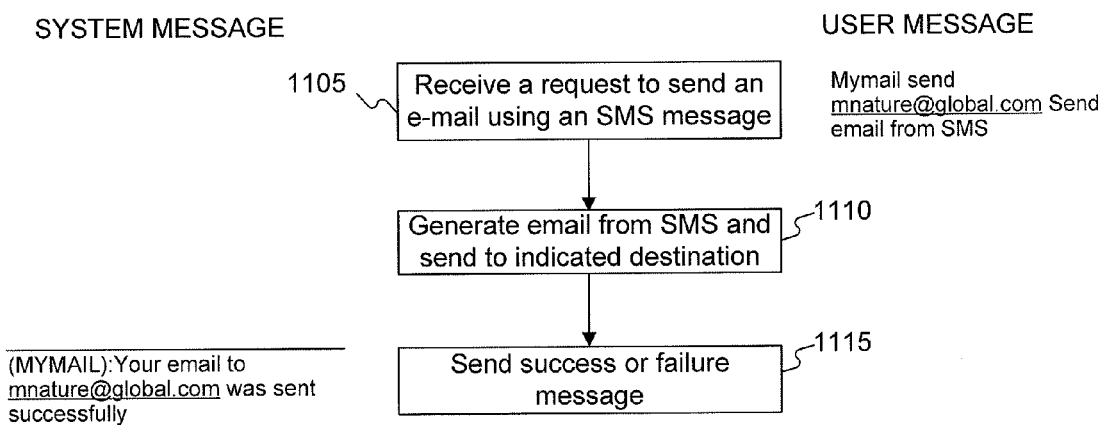
FIG. 11 is a flow diagram illustrating a method for sending an e-mail from a resource-limited interface, consistent with disclosed embodiments.

FIG. 11 is a flow diagram illustrating a method for sending an e-mail from a resource-limited interface, such as an SMS interface, consistent with disclosed embodiments. In step 1105, domain registration system 120 may receive a request via a resource-limited message to send an e-mail message. The request may contain a "send" command, a destination address, and the text of a message. Because the e-mail is requested from a resource-limited interface, the text of the message may be limited to a predetermined number of characters, for example, 150 characters or less including the destination address and the send command.

In step 1110, domain registration system 120 may create an e-mail message from the received destination address and text and send the e-mail using known e-mail protocols. In step 1115, domain registration system 120 may send an indication to the user that the e-mail message was successfully sent.

As will be understood by one of skill in the art, the techniques described with respect to FIGS. 2 to 11 may be implemented by a central server, such as domain registration system 120, that corresponds automatically with users via SMS messages. To maintain a consistent request/response chain with a particular user, the system may track one or more previous messages received from a single source. For example, when the user sends and receives SMS messages using a mobile phone, the system may track the prior message(s) received from the number assigned to the phone. In general, each SMS message received by the system will include an indication of the source of the message, which can be used by the system to track the messages received from that user, and to determine appropriate requests and information to send to that user. Domain registration system 120 may use data repository 130, for example, to track the messages.

Figure 12:
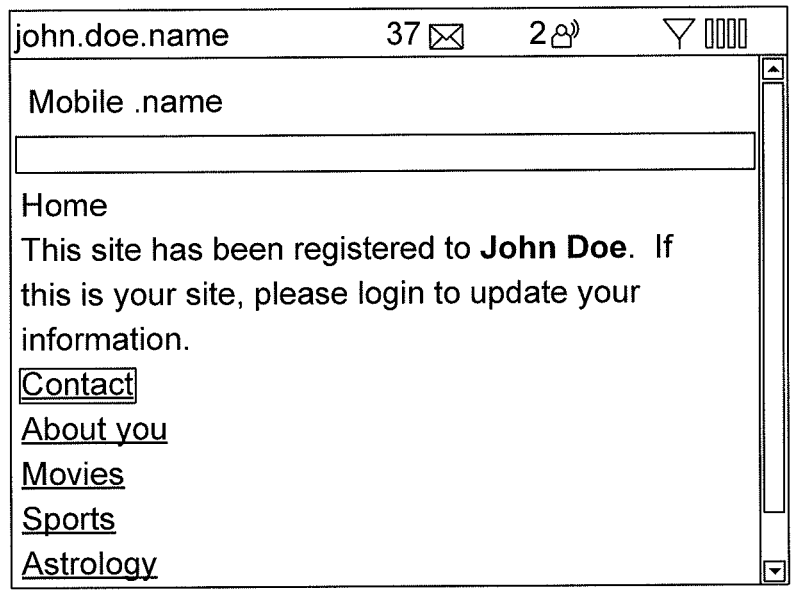
FIG. 12 illustrates an exemplary interface for constructing and maintaining a web site and a user directory, consistent with disclosed embodiments.

Some embodiments may provide additional features and services. For example, domain registration system 120 may enable users to provide profile information and may construct a web site with that information. For example, domain registration system 120 may receive information regarding contact information, personal information, various interests, likes, and dislikes for a particular user and create a web site using that information. Domain registration system 120 may collect such information via a resource-limited interface. For example, domain registration system 120 may request a user's contact information in a manner similar that shown in FIG. 5 for requesting a user's current e-mail address. Domain registration system 120 may collect other profile information through a series of similar question and prompt style resource-limited messages. FIG. 12 shows an exemplary interface for a web site constructed by domain registration system 120 using the profile information.

Figure 13:
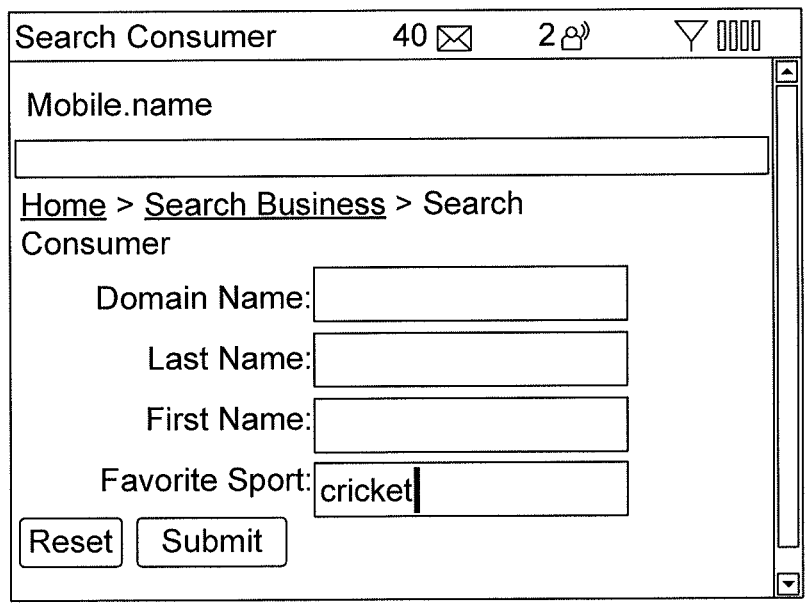
FIG. 13 illustrates an exemplary interface for constructing and maintaining a user directory, consistent with disclosed embodiments.

In other embodiments, domain registration system 120 may maintain a directory that allows other users to search established web sites and/or e-mail addresses. For example, users that register domain names and/or e-mail addresses may opt to be placed in a public directory that domain registration system 120 may search based on the profile information entered. FIG. 13 shows an example user interface for searching such a directory. Domain registration system 120 may collect the search information using, for example, the interface of FIG. 13 and use the information to search the public directory. Search results may be delivered via a resource-limited interface by, for example, sending the first five search results in an SMS message with a prompt to reply to the message with "more" to view the next five results.

Additional functionality may be provided via SMS or other resource-limited protocols. For example, various embodiments may include the following functionality:

| Function | Example User Message | Example System Response |
| --- | --- | --- |
| Block SMS from a particular address | Mymail block user@example.com | You will no longer receive SMS alerts for e-mails from user@example.com |
| Unblock SMS for an address | Mymail unblock user@example.com | You will start receiving SMS alerts for e-mails from user@example.com |
| Logoff (Stop receiving e-mail-to-SMS forwards) | Mymail off | You will no longer receive SMS alerts for e-mails received at Johnny@adams.name |

Some embodiments also may allow for a user to create a personal or business website, such as a wireless application protocol (WAP) formatted site. For example, a user may provide a business name, and receive one or more suggested domains and/or e-mail addresses available to register based on the provided name, in accordance with FIGS. 2-6, discussed above. Domain registration system 120 may provide the user a mechanism to update preferences for the site, such as whether to forward and/or send SMS alerts for received e-mails, and to update contact information and other personal or business information (e.g., address, business type, business field, personal movie, music, sports, and similar preferences, and the like). The site may be listed in a directory or other searchable database automatically or upon the user's request.

Various techniques and systems disclosed herein are described with respect to the SMS protocol. However, one of skill in the art will understand that such techniques may be readily applied to other resource-limited systems and messages, including, but not limited to, the other resource-limited systems disclosed herein, without departing from the scope of the invention.

Embodiments of the invention may be in the form of computer-implemented processes and apparatuses for practicing those processes. For example, embodiments may be embodied in the form of a computer program product having computer program code containing instructions embodied in tangible media, such as floppy diskettes, CD-ROMs, hard drives, USB (universal serial bus) drives, RAM, ROM, or any other non-transitory machine readable storage devices, wherein, when the computer program code is loaded into and executed by a computer, the computer becomes an apparatus for practicing the invention. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions.

It is understood that disclosed embodiments are not limited to the particular methodology, protocols, topologies, etc., as described herein, as these may vary as the skilled artisan will recognize. It is also to be understood that the terminology used herein is used for the purpose of describing particular embodiments only, and is not intended to limit the scope of any particular embodiment. It also is to be noted that as used herein and in the appended claims, the singular forms "a," "an," and "the" include the plural reference unless the context clearly dictates otherwise.

Unless defined otherwise, all technical and scientific terms used herein have the same meanings as commonly understood by one of ordinary skill in the art to which the invention pertains. The embodiments of the invention and the various features and advantageous details thereof are explained more fully with reference to the non-limiting embodiments and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein.

Examples provided herein are merely illustrative and are not meant to be an exhaustive list of all possible embodiments, applications, or modifications. Thus, various modifications and variations of the described methods and systems of various disclosed embodiments will be apparent to those skilled in the art without departing from the scope and spirit of the invention. Although specific embodiments have been described, it should be understood that the invention as claimed should not be unduly limited to such specific embodiments. Indeed, various modifications of the described modes for carrying out the invention that are obvious to those skilled in the relevant arts or fields are intended to be within the scope of the appended claims.

What is claimed is:

1. A computer-implemented method comprising:

receiving, by a processor, a request for availability of a requested domain name via a request message in Simple Messaging Service (SMS) protocol sent by a user, wherein the request SMS message includes at least one term and is formatted in accordance with a request format;

determining, based upon the at least one term and the request format, one or more types of top-level domain for the requested domain name;

determining an availability of the requested domain name in the one or more types of top-level domain;

generating a list of available domain names that includes one or more available domain name variants of the requested domain name and, if available, the requested domain name, wherein the one or more available domain name variants are generated based on the availability of the requested domain name in the one or more types of top-level domain;
generating available e-mail addresses based on the list of available domain names;
sending, using the processor, an SMS message to the user that includes the available e-mail addresses associated with the list of available domain names;
receiving an indication of a selection of one of the available e-mail addresses via SMS messaging; and
establishing the selected e-mail address, wherein the selected e-mail address is configured to forward received e-mails via SMS messaging.

2. The method of claim 1, further comprising:
receiving an indication of a selection of one of the available domain names provided in the list via an SMS message; and
registering the selected domain name.

3. The method of claim 1, further comprising:
generating one or more domain name variants of the requested domain name in the one or more types of top-level domain;
determining an availability of each of the one or more generated domain name variants to provide the one or more available domain name variants;
sending, using the processor, an SMS message to the user that indicates the list of available domain names;
receiving, via SMS messaging, an indication of a selection of one of the available domain names in the list of available domain names, wherein the available e-mail addresses are generated based on the selected domain name; and
registering the selected domain name.

4. The method of claim 1, further comprising:
receiving a first e-mail message sent to the established e-mail address; and
forwarding at least a portion of the received first e-mail message to the user via SMS messaging.

5. The method of claim 4, further comprising:
receiving a request to view another portion of the first e-mail message; and
forwarding at least the another portion of the first e-mail message to the user via SMS messaging.

6. The method of claim 1, further comprising:
receiving an SMS message from the user identifying a forwarding e-mail address; and
configuring the established e-mail address to forward received e-mails to the identified forwarding e-mail address.

7. The method of claim 1, wherein the request format is predefined to identify at least one type of top-level domain.

8. A computer-implemented method comprising:
receiving, by a processor, a resource-limited request message sent by a user requesting a domain name, wherein the request message includes at least one term and is formatted in accordance with a request format;
determining, based upon the at least one term and the request format, one or more types of top-level domain for the domain name;
generating at least one domain name in the one or more types of top-level domain based upon the at least one term;
determining that the at least one domain name is available for registration in the one or more types of top-level domain;
generating available e-mail addresses based on the at least one available domain name;
sending, using the processor, a resource-limited message to the user providing the available e-mail addresses;
receiving a selection of one of the available e-mail addresses from the user via a resource-limited message;
establishing the selected e-mail address; and
configuring the established e-mail address to forward received e-mails to the user via resource-limited messaging.

9. The method of claim 8, further comprising:
generating a plurality of domain name variants based upon the at least one term;
determining an availability of each of the generated variants in the one or more types of top-level domain; and
providing one or more of the generated variants determined to be available to the user via a resource-limited message.

10. The method of claim 8, further comprising:
generating a plurality of domain name variants of the requested domain name in the one or more types of top-level domain;
determining an availability of each of the plurality of generated domain name variants to provide the at least one available domain name;
sending, using the processor, a resource-limited message to the user that indicates the at least one available domain name;
receiving, via resource-limited messaging, a selection of one of the at least one available domain name, wherein the available e-mail addresses are generated based on the selected domain name; and
registering the selected domain name.

11. The method of claim 8, further comprising:
receiving a first e-mail message sent to the established e-mail address; and
forwarding at least a portion of the received first e-mail message to the user via resource-limited messaging.

12. The method of claim 8, further comprising:
receiving a resource-limited message from the user identifying a forwarding e-mail address; and
configuring the established e-mail address to forward received e-mails to the identified forwarding e-mail address.

13. The method of claim 8, wherein the request format is predefined to identify at least one type of top-level domain.

14. The method of claim 8, wherein each resource-limited message is in a service protocol that restricts each resource-limited message to at most 160 characters.

15. A system comprising:
a processor;
a memory including instructions that, when executed by the processor, cause the processor to perform operations comprising:
receiving a resource-limited request message sent by a user requesting a domain name, wherein the request message includes at least one term and is formatted in accordance with a request format,
determining, based upon the at least one term and the request format, one or more types of top-level domain for the domain name,
generating at least one domain name in the one or more types of top-level domain based upon the at least one term,
determining that the at least one domain name is available for registration in the one or more types of top-level domain, generating available e-mail addresses based on the at least one available domain name, sending a resource-limited message to the user providing the available e-mail addresses, receiving a selection of one of the available e-mail addresses from the user via a resource-limited message, establishing the selected e-mail address, and configuring the established e-mail address to forward received e-mails to the user via resource-limited messaging.

16. The system of claim 15, wherein the instructions further cause the processor to perform operations comprising:

generating a plurality of domain name variants based upon the at least one term;

determining an availability of each of the generated variants in the one or more types of top-level domain; and providing one or more of the generated variants determined to be available to the user via a resource-limited message.

17. The system of claim 15, wherein the instructions further cause the processor to perform operations comprising:

generating a plurality of domain name variants of the requested domain name in the one or more types of top-level domain;

determining an availability of each of the plurality of generated domain name variants to provide the at least one available domain name;

sending a resource-limited message to the user that indicates the at least one available domain name;

receiving, via resource-limited messaging, a selection of one of the at least one available domain name, wherein the available e-mail addresses are generated based on the selected domain name;

registering the selected domain name.

18. The system of claim 15, wherein the instructions further cause the processor to perform operations comprising:

receiving a first e-mail message sent to the established e-mail address; and forwarding at least a portion of the received first e-mail message to the user via a resource-limited message.

19. The system of claim 18, wherein the instructions further cause the processor to perform operations comprising:

receiving a request to view another portion of the first e-mail message; and forwarding at least the another portion of the first e-mail message to the user via a resource-limited message.

20. The system of claim 15, wherein the instructions further cause the processor to perform operations comprising:

receiving a resource-limited message from the user identifying a forwarding e-mail address; and configuring the established e-mail address to forward received e-mails to the identified forwarding e-mail address.

21. The system of claim 15, wherein the request format is predefined to identify at least one type of top-level domain.

22. The system of claim 15, wherein each resource-limited message is in a service protocol that restricts each resource-limited message to at most 160 characters.

23. A non-transitory computer-readable medium storing instructions for registering domain names, the instructions causing one or more computer processors to perform operations, comprising:

receiving a resource-limited request message sent by a user requesting a domain name, wherein the request message includes at least one term and is formatted in accordance with a request format;

determining, based upon the at least one term and the request format, one or more types of top-level domain for the domain name;

generating at least one domain name in the one or more types of top-level domain based upon the at least one term;

determining that the at least one domain name is available for registration in the one or more types of top-level domain;

generating available e-mail addresses based on the at least one available domain name;

sending a resource-limited message to the user providing the available e-mail addresses;

receiving a selection of one of the available e-mail addresses from the user via a resource-limited message;

establishing the selected e-mail address; and configuring the established e-mail address to forward received e-mails to the user via resource-limited messaging.

24. The computer-readable medium of claim 23, wherein the instructions further cause the processor to perform operations comprising:

receiving a first e-mail message sent to the established e-mail address; and forwarding at least a portion of the received first e-mail message to the user via a resource-limited message.

25. The computer-readable medium of claim 23, wherein the instructions further cause the processor to perform operations comprising:

generating a plurality of domain name variants of the requested domain name in the one or more types of top-level domain;

determining an availability of each of the plurality of generated domain name variants to provide the at least one available domain name;

sending a resource-limited message to the user that indicates the at least one available domain name;

receiving, via resource-limited messaging, a selection of one of the at least one available domain name, wherein the available e-mail addresses are generated based on the selected domain name; and registering the selected domain name.

26. The computer-readable medium of claim 23, wherein each resource-limited message is in a service protocol that restricts each resource-limited message to at most 160 characters.

* * * * *